United States Patent [19]

Schlossel

[11] Patent Number: 4,824,575

[45] Date of Patent: Apr. 25, 1989

[54] METAL-CONTAINING WASTE WATER TREATMENT AND METAL RECOVERY PROCESS

[76] Inventor: Richard H. Schlossel, 15 Woodside Ave., Metuchen, N.J. 08840

[21] Appl. No.: 64,520

[22] Filed: Jun. 22, 1987

[51] Int. Cl.⁴ ............................ B01J 49/00; C02F 1/42
[52] U.S. Cl. .................................. 210/662; 210/675;
                     210/677; 210/688; 423/DIG. 14
[58] Field of Search ............... 210/670, 672, 675, 678,
        210/688, 275, 278, 279, 282, 662, 677; 423/6,
                     22, 24, 54, 89, 100, 139, DIG. 14

[56] References Cited

U.S. PATENT DOCUMENTS

| | | | |
|---|---|---|---|
| 3,101,316 | 8/1963 | Rose | 210/670 |
| 3,658,470 | 4/1972 | Zievers et al. | 210/684 |
| 4,001,113 | 1/1977 | Schoenrock et al. | 210/678 |
| 4,049,548 | 9/1977 | Dickerson | 210/282 |

Primary Examiner—Ivars Cintins
Attorney, Agent, or Firm—Behr Omri M.

[57] ABSTRACT

A process is described involving the detoxification of waste water containing heavy metals which includes recovering the metals in salable form. The metals are removed from the waste water by contacting the water with an ion exchange resin bed contained in a portable canister until it is determined that the resin is saturated with metal. This determination is made by measuring the appearance of heavy metal salts in the effluent from the canister. Regeneration of the resin and recovery of the metal is accomplished in a location diverse to that where the metal is removed from the waste water by (a) back washing the resin with water into a backwashing receiver (b) forward washing the resin with water (c) forward washing the resin with a regenerating solution (d) forward washing the resin with a regenerating solution (d) collecting the regenerating in a plurality of fractions wherein the first fractions contain the majority of the metal recovered and (e) forward washing the resin with water to remove excess regenerating agent.

7 Claims, 1 Drawing Sheet

METAL-CONTAINING WASTE WATER TREATMENT AND METAL RECOVERY PROCESS

BACKGROUND OF THE INVENTION

This invention concerns a system for detoxifying chemical wastes. More particularly, this invention concerns a system for detoxifying the discharges from electroplating, metal finishing, and other chemical processes involving heavy metal salts, including the recovery of metals therefrom, as well as a portable resin cartridge for use in the system.

Over the past decade and a half, there has been a growing awareness in government, industry, and the general public alike that more sophisticated methods must be used in the management of the discharges of our industrial society or our health and well being will suffer significantly. This awareness has resulted in legislation and concomitant regulations which often address the problem in terms of prohibitions, with the result that the atmosphere in which efforts toward adequate detoxification or reprocessing for reuse of materials have been attempted has been clouded by confusion, fear, and accusation.

A major social aspect of this particular problem is that the metal finishing industry is, to a large degree, made up of a number of independent job shops clustered in metropolitan areas. These job shops are usually moderate in size and lack sophisticated in-house technical staff. They are also mostly sole proprietorships which, if faced with economically impractical alternatives, would shut down, thus depriving their home communities of employment opportunities and tax revenues.

The United States Environmental Protection Agency (hereafter called EPA) recommended treatment of electroplating wastes consists of reduction of hexavalent chromium to trivalent chromium and oxidation of cyanide, followed by precipitation of all metals together as hydroxides. The high investment and operating costs for this system would force many electroplating job shops to shut down their operations. EPA estimates show that 21–36% of the metal finishing industry will be forced to close should compliance with regulations be enforced. The smaller operators would be the ones most affected. See "Economic Analysis of Effluent Guidelines—The Metal Finishing Industry," United States Environmental Protection Agency, EPA 230/1-74-032 (1974).

The regulatory aspects concerning this problem have been promulgated by the EPA in the Metal Finishing effluent limitations. See "Electroplating and Metal Finishing Point Source Categories, Effluent Limitations Guidelines, Pretreatment Standards and New Source Performance Standards," United States Environmental Protection Agency, Federal Register, July 15, 1983. This regulation sets concentration limits on the discharge of pollutants from electroplating and metal finishing facilities into U.S. waters or into publicly owned treatment works. The reference gives a summary of the regulation, background of the regulation, the legal authority, and the compliance schedule. The compliance date for existing non-integrated electroplating plants was Apr. 27, 1984.

The major technical aspects of the problem derive from the need to process relatively large volumes of rinse water which contain only small amounts of dissolved metal salts and to significantly reduce the concentration of these already dilute solutions to meet discharge regulations. Further, it is necessary to process the rinse waters from each metal finishing line separately so as to maintain the segregation of the metals involved, if they are to be recovered for reuse or sale. The separation of mixed metals, except in special cases, is very difficult and expensive.

Several alternative treatments have been suggested in the literature to enable an electroplater to meet the regulations for discharge of metals and cyanide. These alternatives include the following methods:

(a) Concentration methods like evaporation, reverse osmosis and electrodialysis;

(b) Separation methods like activated carbon adsorption and ion exchange;

(c) Precipitation methods like the EPA recommended "destruct" system.

Detailed reviews of these methods have been presented elsewhere. See "Recovery of Metal Values from Electroplating Industry Wastewaters," by A. Gupta, Department of Chemical Engineering, Princeton University (1982). The more practicable of these alternatives are the following:

(a) Reverse osmosis—This method uses a semipermeable membrane which allows passage of pure water but not dissolved salts or other materials. The application of pressure to the contaminated water causes the pure water itself to cross the membrane in the direction opposite to the osmotic pressure, with the result that the dissolved materials become more concentrated and the pure water passing through the membrane is available for reuse.

(b) Ion exchange—In this method the rinse water effluents are passed through beds of ion exchange resins which selectively remove the metal ions. The resins can be regenerated for subsequent reuse and the metal ions can be recovered from the regenerant solutions.

(c) "Destruct" system—This involves the reduction of hexavalent chromium to trivalent chromium, the oxidation of the cyanide, and then the precipitation of all the metals as hydroxides by treatment with caustic or lime.

On-site recycling techniques like reverse osmosis and evaporation may be economically feasible if there is sufficient metal to be recovered. Separate units are required for each metal. In large plating installations the value of metal recovered might pay back the investment in such techniques. It would be difficult to recover this investment if the metal discharge rate is relatively low, as is the case for most job shops. On-site recovery also requires skilled operators trained in the specific techniques employed. This is often not economically feasible for job shops.

While the "destruct" precipitation system has the advantage that it can process mixed metal inputs in-plant, it has several major disadvantages, as follows:

(1) The precipitation and clarification equipment require a lot of space. It is estimated that nearly 5000 square feet will be needed for a typical 38-employee establishment. See "Economic Analysis of Effluent Guidelines—The Metal Finishing Industry," United States Environmental Protection Agency, EPA 230/1-74-032 (1974). This might be a problem with job shops, many of which have little free floor space.

(2) Experienced and skilled personnel are required to operate the system properly. Metal hydroxide precipitates are difficult to filter or dewater. In addition, precipitation from a dilute solution is difficult to control.

(3) The "destruct" precipitation system is typically operated as a continuous feed process and is easiest to control when the incoming concentrations of metals are constant. The electroplating processes linked to it are typically batch processes whose metal discharge concentrations vary widely. This is a significant materials flow mismatch.

(4) The destruct system produces metal hydroxide sludges which have to be transported to a hazardous waste landfill. The sludge disposal costs have been rising and are expected to rise rapidly in the future. Regulations banning land disposal of such materials are in effect in some states and are expected in others. Even where land disposal is available, the generator of these wastes is liable for any future damage resulting from the leakage of the landfill.

(5) No economical method is available to recover the metal values from these mixed metal hydroxide sludges, so the metals cannot be recycled. Since many metal sources are getting depleted, their recovery is important to our long term needs.

(6) The high investment and operating costs for the "destruct" system would force many job shops to shut down their operations. As was indicated above, EPA estimates show that 21–36% of the metal finishing industry will be forced to close and that the smaller operators will be the most affected. Other estimates of job shop closures are considerably higher.

The idea of relocating the electroplaters in close proximity to each other and then using a joint "destruct" system for the accumulated waste waters had been envisaged. This would not be very practical because most of the job shops have been located at their current locations for a number of years and have been shown to be extremely unwilling to move their operations to a new site adjacent to their competitors (e.g., failure of the Plating City project, Brooklyn Economic Development Corporation, Brooklyn, N.Y.).

In contrast to the "destruct" system, ion exchange equipment is very compact, hence its space requirement is very low. The main advantage of ion exchange is that it is quite versatile. A batch process like electroplating can be integrated with ion exchange treatment easily. Variations in concentration of metal ions and changes in flow rate can be easily handled.

Another major advantage of ion exchange is that it is a recovery process. The need for landfilling is eliminated, as no sludge is generated. Valuable metals are recovered for reuse. It is the only recovery technology adaptable to centralized treatment. Centralized treatment offers considerable savings to small job shops because of the pooling of costly equipment and the economies of scale. A central facility can also operate more profitably because it has access to more resources and technical expertise than the individual electroplater.

SUMMARY OF THE INVENTION

An object of the invention is to provide a highly economical process for treating waste water having metal values.

Another object of the invention is to provide a highly economical process for recovering metal values from waste water.

A further object of the invention is to provide a highly economical process for recovering metal values from waste water in a form useful for direct sale.

Another object of the invention is to provide a highly economical process which enables a major part of the treatment of wastes from a variety of processes to take place in one location.

A specific object of the invention is the provision of a highly economical process for detoxifying waste water from electroplating, metal finishing, and other chemical processes involving heavy metal salts.

These and other objects of the invention are accomplished by the process of treating waste water comprised of introducing the waste water to a portable cannister filled with a bed of ion exchange resin, whereby the heavy metal salts are removed from the waste water and held in the resin bed. Following saturation of the resin bed with heavy metal salts, the portable cannister is removed to a regeneration zone where the resin bed is backwashed with water with the help of a backwashing receiver, forward-washed with water which returns the entire resin bed to the portable cannister, and forward-washed with a regenerating agent which displaces the metal salts from the resin until most of the metal values have been removed from the resin to form a regenerant solution. The regenerant solution is collected in a plurality of fractions in the order in which the regenerant solution emerges from the resin bed, wherein the first fractions contain the major portion of recovered metal values in salable form. The resin bed is then forward-washed with water which removes any excess regenerating agent solution and returns the resin bed to a condition whereby the cannister can be returned to a waste water treatment zone and be reused in waste water treatment.

DETAILED DESCRIPTION OF THE INVENTION

Figure 1B:
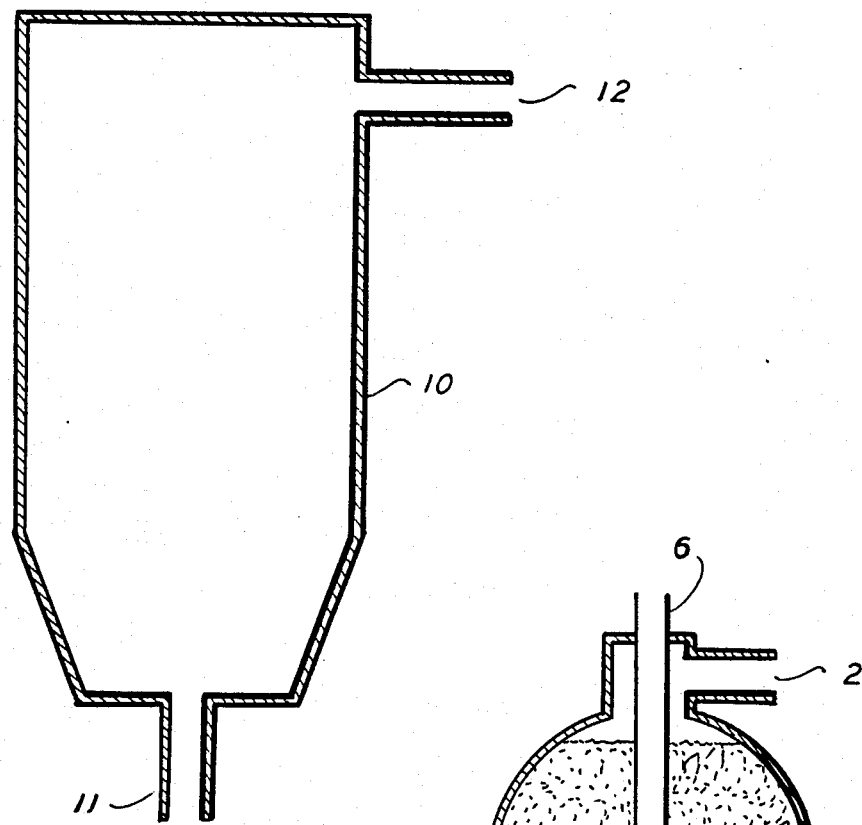
FIG. 1b shows the backwashing receiver. Part 10 is the body of the receiver, 11 is the inlet port, 12 is the outlet port.

The invention being described is a process for treating waste waters. These waste waters emerge from a variety of chemical and engineering processes. What they have in common is that they contain dissolved heavy metal salts as well as the possibility of other materials.

By heavy metals we mean metallic elements with atomic weights greater than 40 atomic mass units. Specific examples are: cadmium, chromium, cobalt, copper, gold, iron, lead, mercury, molybedenum, nickel, palladium, platinum, plutonium, rhodium, silver, tin, uranium, and zinc.

Waste waters containing dissolved heavy metal salts are produced through a variety of chemical and engineering processes such as but not limited to cleaning of metal and other surfaces, chemical synthesis, refining of ores, chemical treatment of materials, chemical treatment of surfaces, fabrication of objects, washing of materials produced through the above operations, and others.

Specific examples of cleaning of metal and other surfaces are cleaning of steel machine part surfaces with hydrochloric acid prior to surface finishing with paint and cleaning of zinc castings with alkaline detergents prior to surface finishing by electroplating.

Specific examples of chemical synthesis are production of lead chromate pigments by combination of lead nitrate and sodium chromate and production of zinc chromate pigments by combination of zinc oxide and sodium dichromate.

Specific examples of refining of ores are acid leaching of uranium from uranium ores and aqua regia leaching of platinum and gold from platinum and gold ores.

Specific examples of chemical treatment of materials are the chemical tanning of leather using sodium chromate and the preserving of fence posts using copper naphthenate or zinc chloride.

Specific examples of chemical treatment of surfaces are electroplating steel surfaces with corrosion resistant metal films such as nickel, cadmium, or chromium and electropolishing of stainless steel.

A specific example of fabrication is electrodeposition of lead/tin solder on printed circuit boards.

Several of these chemical and engineering processes involve metal finishing. Specifically, these involve operations such as but not limited to cleaning, polishing, applying decorative coatings, applying corrosion resistant coatings, applying coatings with special properties and others. Specific examples are cleaning of zinc castings prior to electroplating, electroplating these castings with brass for decoration, electropolishing stainless steel, electroplating steel automobile bumpers with nickel and chromium for corrosion resistance, electroplating aircraft engine parts with cadmium to allow disassembly after high temperature service.

Several of these metal finishing processes involve electroplating, which is a process for depositing a metal film on a surface by chemical or electrochemical reduction of salts of these metals in solution at the surface to be coated. Specific examples of electroplating are coating zinc castings with a brass film by electro-reduction of a mixture of copper and zinc cyanide salts and coating steel with a nickel film by electro-reduction of nickel salts.

Waste waters from all of these processes contain dissolved heavy metal salts, as well as the possibility of other materials, in forms such that it is not advantageous to utilize or sell these waters without further treatment. The invention being described is a process for treating these waste waters to detoxify them for discharge. It is also a process for recovery of metal values from these waste waters. It is also a process for recovery of metal values from these waste waters in salable form.

The waste water is introduced to a portable cannister filled with a bed of ion exchange resin. A portable cannister is shown in FIG. 1a. The body of the cannister 1 consists of a cylinder 13" in diameter and 45" high constructed of fibre-glass reinforced polyester. Other dimensions and materials of construction may be used without altering the process so long as the cannister is portable, chemically resistant, and can be moved from the waste water treatment zone to the regeneration zone and back.

The waste water is introduced at the inlet port 2 of the cannister and moves downward through the resin bed 3. As the waste water moves downward through the resin bed 3 the heavy metal salts are removed from the waste water and held in the resin bed.

The particular ion exchange resin used in the resin bed depends on the type of metal salt to be removed. If the metal is present as a cation (an ion bearing a positive charge), then a cation resin is chosen. For example, nickel is electroplated from acidic solutions of nickel chloride and nickel sulfate. Rinse waters from this process contain nickel cation. A cation resin such as but not limited to Amberlite IR-120, Rohm and Haas Company, Philadelphia, Pa., removes the nickel cation from the waste waters.

If the metal is present as an anion (an ion bearing a negative charge), then an anion resin is chosen. For example, chromium is electroplated from solutions of chromic acid. Rinse waters from this process contain chromate and/or dichromate anions. An anion resin such as but not limited to Amberlite IRA-400. Rohm and Haas Company, Philadelphia, Pa., removes the chromate and/or dichromate anions from the waste waters. Another example is cadmium, which is electroplated from alkaline cyanide solutions. Rinse waters from this process contain cadmium cyanide anions. An anion resin such as but not limited to Amberlite IRA-400, Rohm and Haas Company, Philadelphia, Pa., removes the cadmium cyanide anions from the waste waters.

At the bottom of the resin bed 3, the waste water enters the outlet collector 4, travels up the outlet pipe 5, and out the outlet port 6. Standard chemical analyses such as but not limited to colorimetric tests are periodically performed on the exiting waste water. If the concentration of metal ions is low and below the legal standard the waste water is discharged. If the concentration of metal ions is high and above the legal standard the cannister is removed and replaced with another cannister containing fresh or regenerated resin and the process of removing the metal salts from the waste water continues.

Figure 1A:
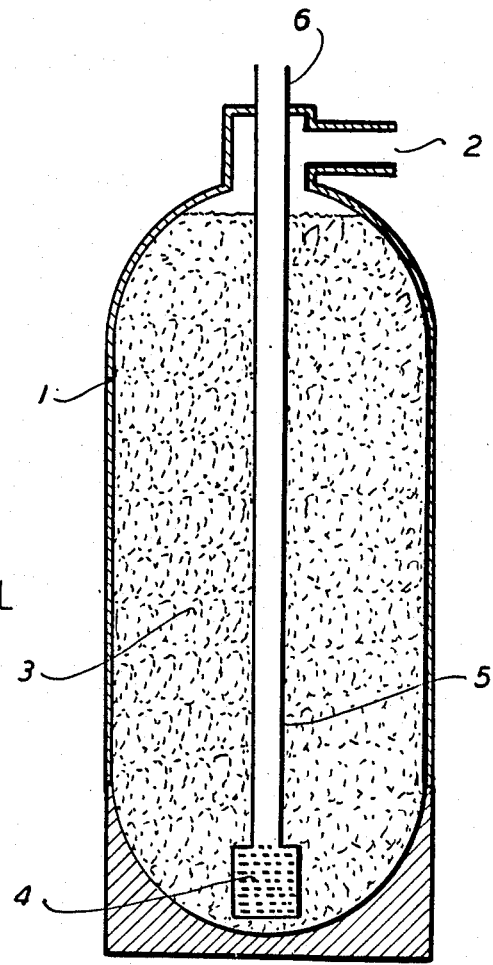
FIG. 1a shows the portable cannister in vertical cross-section view. Part 1 is the body of the cannister, 2 is the inlet port, 3 is the resin bed, 4 is the outlet collector, 5 is the outlet pipe, 6 is the outlet port.

The cannister containing the resin saturated with heavy metal salts is transported to a regeneration zone and is connected to a backwashing receiver, shown in FIG. 1b. The body of the backwashing receiver 10 is typically 18" in diameter and 24" high. Other dimensions may be used without altering the process so long as the receiver is large enough to contain the expanding resin bed and ported to allow the exiting of water carrying suspended insoluble fine particles. The outlet port 6 of the cannister is connected to a source of water. The inlet port 2 of the cannister is connected to the inlet port 11 of the backwashing receiver. The outlet port 12 of the backwashing receiver is connected to a discharge path.

Water is then passed in the cannister outlet port 6, through the outlet pipe 5, through the outlet collector 4, and through the resin bed 3. As this is carried out, the resin bed 3 expands and a small portion of the resin bed moves through the inlet port 2 of the cannister, through the inlet port 11 of the backwashing receiver and into the backwashing receiver. During the backwashing step the resin bed 3 is loosened, entrained air is displaced, and any suspended insoluble material that may have accumulated in the bed during service is removed. An advantage of backwashing with a backwash receiver is that the cannister can be filled to capacity with the resin bed 3. The provision of an internal dead space to accomodate bed expansion during backwash is unnecessary and more efficient space utilization is accomplished.

The resin bed 3 is then forward-washed with water by connecting the outlet port 12 of the backwashing receiver to a water source and the outlet port 6 of the cannister to a discharge path. Water is then passed in the outlet port 12 of the backwashing receiver, through the resin bed 3, carrying the small portion of the resin bed 3 in the backwashing receiver through the inlet port 11 of the backwashing receiver, through the inlet port 2 of the cannister and resetting the entire resin bed in the cannister. The water continues down the cannister, through the outlet collector 4, up the outlet pipe 5, and out of the outlet port 6.

The resin bed 3 is then regenerated by forward-washing with a regenerating solution. The regenerating solution is chosen from the agents that are appropriate to the particular resin in use and that will displace the particular metal ion that is being held. Cation resins are regenerated with acids. For example, nickel cation held on Amberlite IR-120 resin, Rohm and Haas Company, Philadelphia, Pa., is displaced by a solution of sulfuric acid. Hydrochloric acid may also be used.

Anion resin are regenerated with bases. An example is chromate anion held on Amberlite IRA-400 resin, Rohm and Haas Company, Philadelphia, Pa. The chromate is displaced by a solution of sodium hydroxide. Potassium hydroxide may also be used.

When metal cyanide anions are held on anion resins, displacing them presents special problems. These anions are held very strongly. Thiocyanate salts such as but not limited to sodium thiocyanate displace metal cyanide anions. The resin is then further treated with a solution of sodium hydroxide or other appropriate base which displaces the thiocyanate anion and regenerates the resin to its former state. The resin can be reused without this final step when it is acceptable for thiocyanate anion to be released as metal cyanide anions are removed from solution. For example, cadmium cyanide anion held on Amberlite IRA-400 resin, Rohm and Haas, Philadelphia, Pa., is displaced by a solution of sodium thiocyanate.

To carry out the regeneration, the resin bed 3 is forward washed with a regenerating solution by connecting the inlet port 2 of the cannister to a source of the regenerating solution and the outlet port 6 of the cannister to a collection system capable of collecting a plurality of fractions in the order in which they emerge from the resin bed through outlet port 6. The regenerating solution is then introduced into inlet port 2 of the cannister and passes through the resin bed 3 displacing the metal ions and forming the regenerant solution. The solution passes down through the resin bed 3, through the outlet collector 4, up the outlet pipe 5, out the outlet port 6 and into the collection system which holds the outflowing regenerant solution in four or more fractions. Regeneration continues until most of the metal values have been displaced to the regenerant solution. This is determined by standard methods of chemical analysis of the regenerant solution fractions.

The first fractions of regenerant solution are concentrated solutions of metal salts in salable form. For example, nickel cation displaced by a solution of sulfuric acid results in a regenerant solution that is a concentrate of nickel sulfate. Chromate anion that is displaced by a solution of sodium hydroxide results in a regenerant solution that is a concentrate of sodium chromate. Later fractions of regenerant solution are progressively more dilute solutions of metal salts in progressively more concentrated solutions of the regeneration agents.

These later fractions of regenerant solution are reused as regeneration solution in order to raise their concentration of metal salts to salable levels and to make most efficient use of regeneration agent supplies.

The final step in regeneration of the resin bed 3 involves forward-washing with water. Inlet port 2 of the cannister is connected to a source of water and outlet port 6 of the cannister is connected to a discharge path. Water is introduced through inlet port 2 of the cannister and passes through the resin bed 3, removing excess regeneration solution. The water then passes through the outlet collector 4, up the outlet pipe 5, out the outlet port 6 and into the discharge path. This returns the resin bed to a regenerated condition. The cannister can then be returned to a waste water treatment zone and be reused in waste water treatment.

Because the cannisters are portable, a single regeneration zone can serve many waste water treatment zones. Because regeneration zone apparatus and operation are more complex and expensive than waste water treatment zone apparatus and operation, considerable economic savings can be realized by serving many waste water treatment zones from a single regeneration zone.

I claim:

1. A process for treating waste water, containing heavy metal salt contaminants to remove and recover the metal values therefrom comprising the steps of:
   (a) introducing the waste water to a first portable water-conducting canister containing a bed of ion exchange resin capable of removing the heavy metal ions from said waste water and retaining same in said resin bed, and permitting said waste water to exit from said canister after contact with said bed;
   (b) removing said first portable canister to a regeneration zone;
   (c) replacing the portable canister with a second portable canister containing a fresh or regenerated resin bed;
   (d) connecting said first canister to a backwash receiver;
   (e) treating said resin bed in said first canister by the steps of:
      (i) backwashing the resin bed with water and permitting a portion of the resin bed to expand into the backwashing receiver;
      (ii) forward-washing the resin bed with water and permitting the portion of the resin bed in the backwashing receiver to be returned to the portable canister;
      (iii) forwarding-washing the resin bed with a regenerant solution effective to displace said heavy metal ions from said resin bed;
      (iv) collecting the regenerant solution; and
      (v) forward-washing the resin bed with water to remove regenerant agent solution.

2. A process according to claim 1, wherein the regenerant solution of step iv is collected in a plurality of fractions.

3. A process according to claim 2, which comprises:
   (a) assaying the metal content of said fractions;
   (b) recovering the metal values from fractions having a pre-determined level of metal content; and
   (c) recycling the remaining fractions having a lower level of metal content into step (iii).

4. A process according to claim 1 wherein the metal ion content in the effluent from said portable canister is assayed, and when said metal ion level exceeds a predetermined value, replacing said portable canister.

5. A process according to claim 1 wherein the metal salt is selected from at least one member of the group consisting of cadmium, chromium, cobalt, copper, gold, iron, lead, mercury, molybdenum, nickel, palladium, platinum, plutonium, rhodium, silver, tin, uranium and zinc.

6. A process according to claim 1 wherein waste water from electroplating is treated.

7. A process according to claim 1 wherein waste water from metal finishing is treated.

* * * * *